(12) United States Patent
Oyama

(10) Patent No.: US 8,610,797 B2
(45) Date of Patent: Dec. 17, 2013

(54) IMAGE PROCESSING DEVICE, IMAGING DEVICE, AND IMAGE PROCESSING METHOD

(75) Inventor: Ichiro Oyama, Osaka (JP)

(73) Assignee: Panasonic Corporation, Osaka (JP)

(*) Notice: Subject to any disclaimer, the term of this patent is extended or adjusted under 35 U.S.C. 154(b) by 31 days.

(21) Appl. No.: 13/519,372

(22) PCT Filed: Nov. 24, 2011

(86) PCT No.: PCT/JP2011/006528
§ 371 (c)(1),
(2), (4) Date: Jun. 27, 2012

(87) PCT Pub. No.: WO2012/086127
PCT Pub. Date: Jun. 28, 2012

(65) Prior Publication Data
US 2012/0287307 A1 Nov. 15, 2012

(30) Foreign Application Priority Data
Dec. 20, 2010 (JP) ................. 2010-283847

(51) Int. Cl.
*H04N 9/68* (2006.01)
*H04N 5/217* (2011.01)
(52) U.S. Cl.
USPC ......................... 348/234; 348/241
(58) Field of Classification Search
USPC .............. 348/222.1, 234–236, 241–242, 256; 358/530, 540
See application file for complete search history.

(56) References Cited

U.S. PATENT DOCUMENTS

| 6,088,059 A | 7/2000 | Mihara et al. |
| 7,489,345 B2 | 2/2009 | Fukumoto |
| 7,764,319 B2 | 7/2010 | Fukumoto |
| 7,864,427 B2 | 1/2011 | Korenaga et al. |

(Continued)

FOREIGN PATENT DOCUMENTS

| JP | 9-238357 | 9/1997 |
| JP | 11-355636 | 12/1999 |

(Continued)

OTHER PUBLICATIONS

International Search Report issued Feb. 28, 2012 in International (PCT) Application No. PCT/JP2011/006528.

*Primary Examiner* — Kelly L Jerabek
(74) *Attorney, Agent, or Firm* — Wenderoth, Lind & Ponack, L.L.P.

(57) ABSTRACT

An image processing device includes: a luminance saturation position detection unit which detects a luminance saturation position that is a position in a captured image at which a luminance value is greater than a predetermined value; a luminance gradient detection unit which detects a luminance gradient around the luminance saturation position; a light source image estimation unit which estimates a luminance distribution on an imaging surface, based on (i) an image at the luminance saturation position, (ii) a point spread function image which corresponds to the luminance saturation position, and (iii) the luminance gradient, such that the luminance value increases as the luminance gradient increases, the luminance distribution being formed by an object whose image is captured at the luminance saturation position; and an unnecessary light subtraction unit which subtracts a luminance value of unnecessary light from the captured image by using the luminance distribution.

8 Claims, 16 Drawing Sheets

(56) References Cited

U.S. PATENT DOCUMENTS

| | | |
|---|---|---|
| 2005/0093992 A1 | 5/2005 | Fukumoto |
| 2007/0046793 A1* | 3/2007 | Sudo ................................ 348/256 |
| 2007/0268396 A1* | 11/2007 | Kurane ........................ 348/362 |
| 2008/0291296 A1* | 11/2008 | Oike ............................ 348/234 |
| 2009/0027521 A1 | 1/2009 | Fukumoto |
| 2010/0039539 A1* | 2/2010 | Kinoshita ..................... 348/242 |
| 2010/0118186 A1* | 5/2010 | Sakagami ..................... 348/453 |
| 2010/0134888 A1 | 6/2010 | Korenaga et al. |
| 2012/0268627 A1* | 10/2012 | Oike ............................ 348/241 |

FOREIGN PATENT DOCUMENTS

| | | |
|---|---|---|
| JP | 2004-120487 | 4/2004 |
| JP | 2005-136917 | 5/2005 |
| JP | 2005-167485 | 6/2005 |
| JP | 4077508 | 4/2008 |
| JP | 2009-284009 | 12/2009 |

* cited by examiner

IMAGE PROCESSING DEVICE, IMAGING DEVICE, AND IMAGE PROCESSING METHOD

TECHNICAL FIELD

The present invention relates to techniques for reducing unnecessary light (flare) in captured images by image processing after images are captured, when bright objects are captured and large unnecessary light is included in the captured images.

BACKGROUND ART

When an image of a bright object is captured by an imaging device that captures an object, unnecessary light in a captured image can be large enough to be visible, adversely affecting the captured image. Especially when a diffractive lens having a diffraction grating is used, the unnecessary light can be larger than when an aspheric lens is used. For example, unnecessary light that looks like a double image can appear in the captured image, when a light source such as a fluorescent lamp is captured.

Examples of conventional techniques that reduce such unnecessary light by image processing include techniques described in Patent Literatures (PTLs) 1 and 2. According to PTL 1, the unnecessary light is estimated based on a convolution integral of a captured image and a point spread function (PSF) image of unnecessary order light (zeroth order light and second order light) of a diffractive lens. Then, the estimated unnecessary light component is subtracted from the captured image. The unnecessary light is thus reduced from the captured image.

According to PTL 2, a plurality of images is captured with different exposure times. The unnecessary light is estimated based on an image captured with a short exposure time, and the estimated unnecessary light component is subtracted from an image captured with a long exposure time. The unnecessary light is thus reduced from the image captured with a long exposure time.

CITATION LIST

Patent Literature

[PTL 1]
Japanese Unexamined Patent Application Publication No. 9-238357
[PTL 2]
Japanese Unexamined Patent Application Publication No. 11-355636

SUMMARY OF INVENTION

Technical Problem

According to PTL 1, image processing is performed by targeting, as unnecessary light, only unnecessary diffracted light (zeroth order light and second order light) other than the design order. Thus, unnecessary light which appears without depending on an order cannot be reduced from the captured image. Furthermore, when the unnecessary light is estimated based on a convolution integral of a captured image and a PSF image, luminance saturation of the captured image due to a bright object results in an estimation of the unnecessary light based on incorrect brightness (luminance) of the object at the luminance saturation position. Thus, the unnecessary light cannot be correctly estimated.

The brighter the object, exceeding a saturation level of the captured image, the smaller the amount of the estimated unnecessary light component becomes than the actual amount. Furthermore, the brighter the subject is, the more prominent the unnecessary light which appears without depending on the order becomes. In other words, when the object is bright and the luminance of the captured image is saturated, the unnecessary light cannot be appropriately reduced.

Furthermore, according to PTL 2, images need to be captured with different exposure times. Thus, for example, when moving pictures are captured and captured images vary due to a movement of object depending on the time, there can be a case where the unnecessary light cannot be correctly estimated. Furthermore, calculation needs to be performed on a plurality of images, and thus a calculation cost increases.

The present invention has been conceived to solve the aforementioned problems, and has as an object to provide an image processing device, an imaging device, and an image processing method which make it possible to generate, based on one captured image capturing a bright object, an output image that has suitably reduced unnecessary light compared to the captured image.

Solution to Problem

In order to achieve the aforementioned object, an image processing device according to an aspect of the present invention includes: a luminance saturation position detection unit configured to detect a luminance saturation position that is a position in a captured image at which a luminance value is greater than a predetermined value; a luminance gradient detection unit configured to detect a luminance gradient around the luminance saturation position; a light source image estimation unit configured to estimate a luminance distribution on an imaging surface, based on (i) an image at the luminance saturation position, (ii) a point spread function (PSF) image which corresponds to the luminance saturation position, and (iii) the luminance gradient, such that the luminance value increases as the luminance gradient increases, the luminance distribution being formed by an object whose image is captured at the luminance saturation position; and an unnecessary light subtraction unit configured to subtract a luminance value of unnecessary light from the captured image by using the luminance distribution.

Furthermore, an imaging device according to an aspect of the present invention includes: the above-described image processing device; and an imaging unit including an optical system and an imaging element and configured to output the captured image.

It is to be noted that the present invention can be implemented not only as an image processing device but also as an image processing method including steps of operations of characteristic components of the above image processing device. Furthermore, the present invention can also be realized as a program which causes a computer to execute the steps included in the image processing method. In addition, it goes without saying that such a program can be distributed via a non-transitory recording medium such as a compact disk read-only memory (CD-ROM) or via a communication network such as the Internet.

Advantageous Effects of Invention

According to the present invention, it is possible to generate, based on one captured image capturing a bright object, an output image that has suitably reduced unnecessary light compared to the captured image.

DESCRIPTION OF EMBODIMENT

Figure 1:
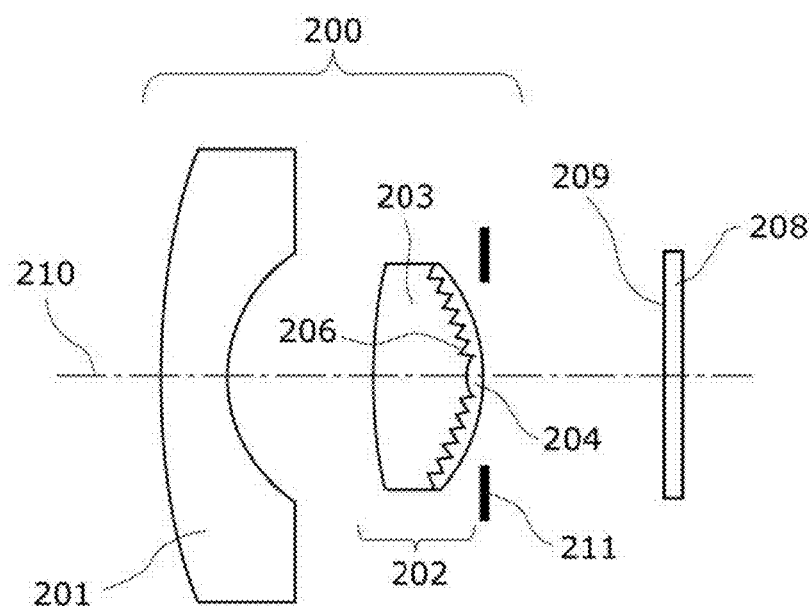
FIG. 1 schematically shows an example structure of an optical system according to an embodiment of the present invention.

An image processing device according to an embodiment of the present invention includes: a luminance saturation position detection unit configured to detect a luminance saturation position that is a position in a captured image at which a luminance value is greater than a predetermined value; a luminance gradient detection unit configured to detect a luminance gradient around the luminance saturation position; a light source image estimation unit configured to estimate a luminance distribution on an imaging surface, based on (i) an image at the luminance saturation position, (ii) a point spread function (PSF) image which corresponds to the luminance saturation position, and (iii) the luminance gradient, such that the luminance value increases as the luminance gradient increases, the luminance distribution being formed by an object whose image is captured at the luminance saturation position; and an unnecessary light subtraction unit configured to subtract a luminance value of unnecessary light from the captured image by using the luminance distribution.

With this structure, the luminance distribution formed on the imaging surface by the object whose image is captured at the luminance saturation position can be estimated such that the luminance value increases as the luminance gradient increases. In other words, even when the correct luminance distribution of the object cannot be obtained from the captured image due to the saturation of the luminance, the luminance distribution on the imaging surface can be accurately estimated using the luminance gradient. The luminance value of the unnecessary light is subtracted from the captured image by using the thus estimated luminance distribution on the estimated imaging surface. This makes it possible to generate using one captured image the output image that has appropriately reduced unnecessary light compared to the captured image. In other words, even when the luminance of the object is saturated in the captured image in which a bright object is captured, unnecessary light in the captured image can be appropriately reduced.

Furthermore, with this structure, it is possible to subtract the luminance value of the unnecessary light from the captured image by using the luminance distribution on the imaging surface that is estimated based on the PSF image. In other words, image processing is performed not targeting only the unnecessary diffracted light other than the design order. Thus, the unnecessary light which appears in the captured image without depending on an order can also be reduced.

Furthermore, in an image processing device according to another embodiment of the present invention, the light source image estimation unit includes: a light source image model production unit configured to produce a light source image model by performing a convolution integral on the image at the luminance saturation position and the PSF image which corresponds to the luminance saturation position; and a light source image gain adjustment unit configured to estimate the luminance distribution on the imaging surface, by adjusting a luminance value of the light source image model such that the luminance value increases as the luminance gradient increases.

With this structure, the light source image model can be produced by performing a convolution integral on an image at the luminance saturation position and the PSF image. The luminance value of the thus produced light source image model is adjusted by using the luminance gradient. With this, it is possible to accurately estimate the luminance distribution on the imaging surface.

Furthermore, in an image processing device according to another embodiment of the present invention, the light source image gain adjustment unit is configured to (i) estimate a highest luminance value on the imaging surface which corresponds to the detected luminance gradient, by using a predetermined relationship between the luminance gradient of the captured image and the highest luminance value on the imaging surface, and (ii) adjust the luminance value of the light source image model by using the estimated highest luminance value.

With this structure, it is possible to accurately estimate the highest luminance value by using the predetermined relationship between the luminance gradient of the captured image and the highest luminance value on the imaging surface. The luminance of the light source image model is adjusted by using the thus estimated highest luminance value. With this, the luminance distribution on the imaging surface formed by the object can be accurately estimated. Therefore, it is possible to generate an output image that has suitably reduced unnecessary light compared to the captured image.

Furthermore, in an image processing device according to another embodiment of the present invention, the captured image is captured using an optical system including a diffractive optical element, and the luminance gradient detection unit is configured to detect the luminance gradient around the luminance saturation position on a side opposite to an optical axis of the optical system.

With this structure, it is possible to detect a luminance gradient on the side opposite to the optical axis of the optical system in a surrounding area of the luminance saturation position. In the image captured using the optical system including the diffractive element, large unnecessary light appears on the side relative to the optical axis of the luminance saturation position. In other words, the luminance gradient on the side opposite to the side of the optical axis is less affected by the unnecessary light compared to the luminance gradient on the side of the optical axis. Thus, it is possible to reduce the influence of the unnecessary light on the detected luminance gradient, by detecting the luminance gradient on the side opposite to the optical axis. Consequently, it is possible to more accurately estimate the luminance distribution on the imaging surface.

Furthermore, an image processing device according to another embodiment of the present invention may be implemented as an integrated circuit.

First, the following describes, with reference to images captured using an optical system including a diffractive optical element, the state in which an object image is saturated and visible unnecessary light appears when bright object is captured. Then, the details of an embodiment according to the present invention shall be described.

FIG. 1 schematically shows an example structure of an optical system according to an embodiment of the present invention. An optical system 200 includes: a lens 201 having a negative power; and a diffractive lens 202 having a positive power. An optical axis 210 of the optical system 200 intersects an imaging surface 209 of an imaging element 208.

The diffractive lens 202 corresponds to a diffractive optical element. The diffractive lens 202 is made of a first component 203 and a second component 204 that are made of mutually different materials. One side of the surface of the first component 203 is formed in an aspheric shape. Furthermore, a diffraction grating 206 that has rings about the optical axis is formed on the other side of the surface of the first component 203. The surface of the diffraction grating 206 is covered by the second component 204 so as to have a non-aspheric shape.

The image of the object is formed on the imaging surface 209 of the imaging element 208 through the optical system 200. The image of the object formed on the imaging surface is captured by the imaging element 208 as a captured image. The imaging element 208 includes Charge Coupled Device (CCD), Complementary Metal Oxide Semiconductor (CMOS), or the like.

The diaphragm 211 adjusts a ray which enters the imaging surface 209 of the imaging element 208.

A grating thickness "d" of the diffraction grating 206 can be obtained using Equation (1).

[Math 1]

$$d = \frac{m\lambda}{n2 - n1}$$ (Equation 1)

Here, n1 represents a refractive index of the first component 203, and n2 represents a refractive index of the second component 204. Represented by "λ" is a wavelength. Here, the optical system 200 is an optical system that is used to capture an image. Thus, "λ" is a value in a wavelength range in a visible range of approximately from 400 nm to 700 nm.

Represented by "m" is a diffraction order. Here, it is m=1. In other words, the grating thickness "d" of the diffraction grating 206 is designed such that a diffraction efficiency of the first order diffracted light is high.

It is known that the diffractive lens 202 can achieve high first order diffraction efficiency in the entire wavelength range in the visible range, by combining the first component 203 and the second component 204 having refractive indexes (n1 and n2, respectively) that allow "d" to be a substantially constant value in the wavelength range in the visible range (for example, see a reference (Japanese Patent No. 4077508)).

The embodiment of the present invention employs the first component 203 and the second component 204 having n1 and n2 which allow "d" to be a substantially constant value.

Figure 2A:
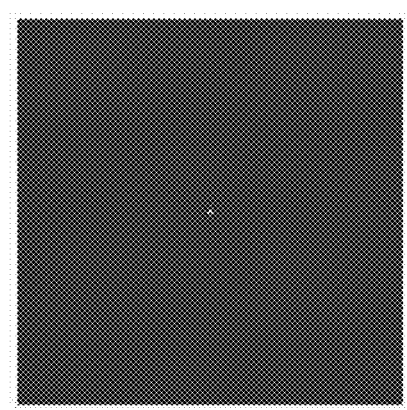
FIG. 2A is a diagram showing a PSF image of the optical system according to the embodiment of the present invention.
Figure 2B:
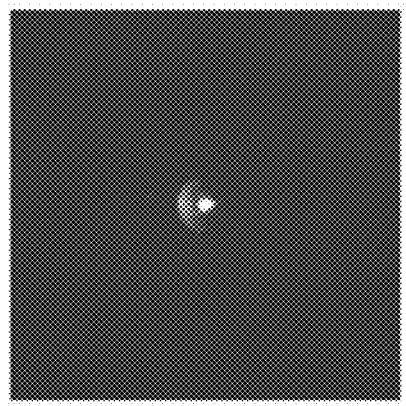
FIG. 2B is a diagram showing the PSF image of the optical system according to the embodiment of the present invention.

FIG. 2A shows a PSF image of the optical system 200 in FIG. 1 at an angle of view approximately 45 degrees. FIG. 2B shows a PSF image obtained by increasing the brightness of the PSF image shown in FIG. 2A by 50 times so that the distribution of unnecessary light component of the PSF image can be easily observed. In each of FIG. 2A and FIG. 2B, the optical axis direction is on the left in the image. In other words, an image position, which corresponds to the position at which the optical axis and the imaging surface intersects, exists on the left in the images. Note that the PSF is a function that expresses a response of the optical system to a point light source. Furthermore, the PSF image is an image which expresses the PSF. In other words, the PSF image is equivalent to an image in which a point light source is captured.

Figure 3A:
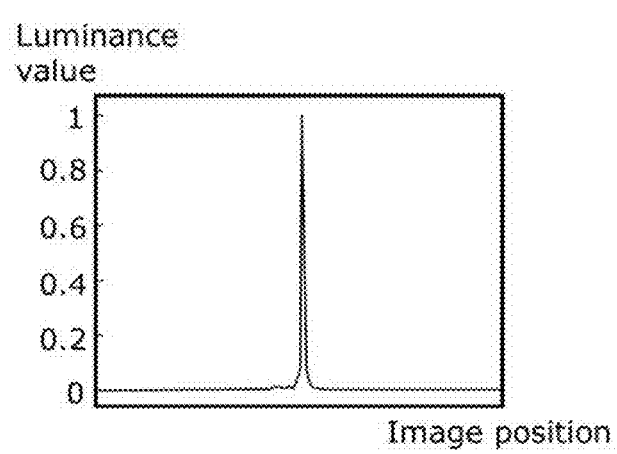
FIG. 3A is a diagram showing a luminance transition of the PSF image of the optical system according to the embodiment of the present invention.
Figure 3B:
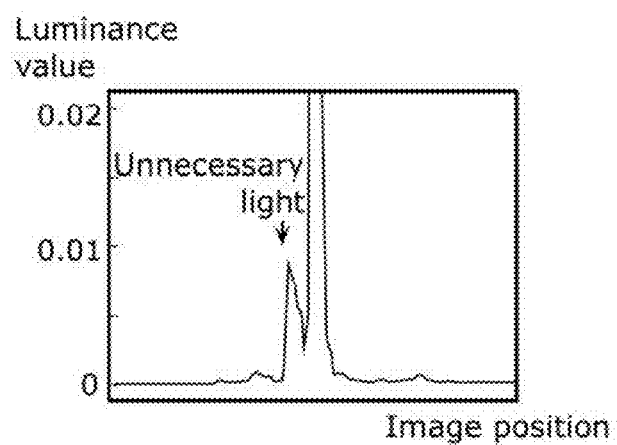
FIG. 3B is a diagram showing a luminance transition of the PSF image of the optical system according to the embodiment of the present invention.

FIG. 3A shows a luminance transition in the horizontal direction of the image in the surrounding area of the highest luminance position of the PSF image in FIG. 2A. In FIG. 3A, the vertical axis represents a luminance value, and the horizontal axis represents the image position. FIG. 3B shows the luminance transition where the scale of the vertical axis of FIG. 3A is enlarged.

As shown in FIG. 2A to FIG. 3B, large unnecessary light appears in the image captured using the optical system including the diffractive optical element. Note that unnecessary light is unnecessary light that appears in the image. In other words, unnecessary light is, in essence, unwanted light in the image. The unnecessary light deteriorates the image quality The unnecessary light includes not only diffracted light such as zeroth order or second order diffracted light other than the design order light (hereinafter also referred to as "unnecessary diffracted light") but also unnecessary light in first order diffracted light that is the design order. The unnecessary light in the first order diffracted light is unnecessary light which appears due to the rings of the diffraction grating. In other words, compared to unnecessary light generated by the aspheric lens, a principle is such that large unnecessary light also appears in the first order diffracted light that is the design order.

In particular, as shown in FIG. 3B, the large unnecessary light noticeably appears in a position on the side of the optical axis relative to the position at which the luminance of the PSF image is highest, when the grating thickness "d" of the diffraction grating is large and when a bright object is captured. For example, large unnecessary light appears at a position on the side of the optical axis relative to the object image, when the luminance at the position of the object image is saturated in the image in which a bright object is captured. The unnecessary light adversely affects the captured image.

The following describes with reference to FIG. 4 to FIG. 6B an example of captured images that include such unnecessary light.

Figure 4:
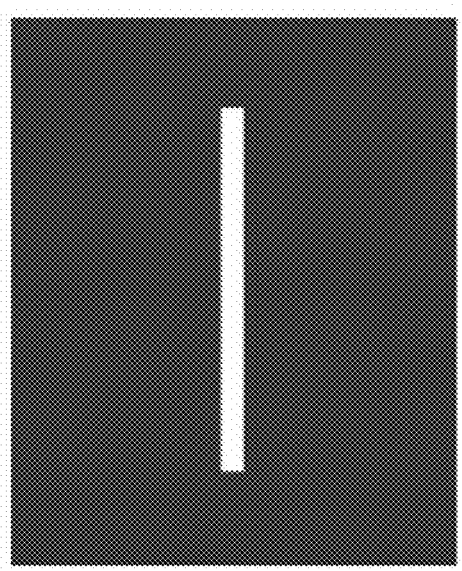
FIG. 4 is a diagram showing an object according to the embodiment of the present invention.
Figure 5A:
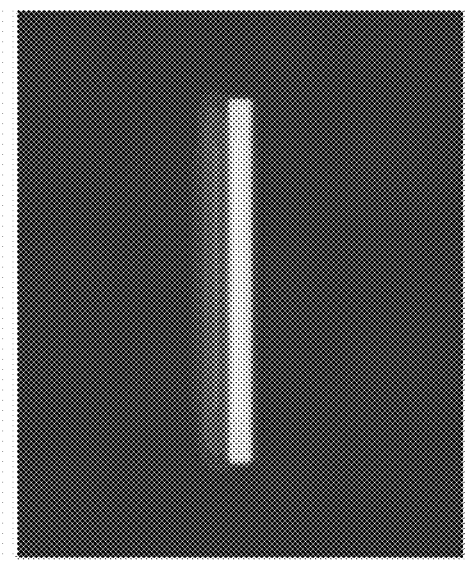
FIG. 5A is a diagram showing a captured image according to the embodiment of the present invention.
Figure 5B:
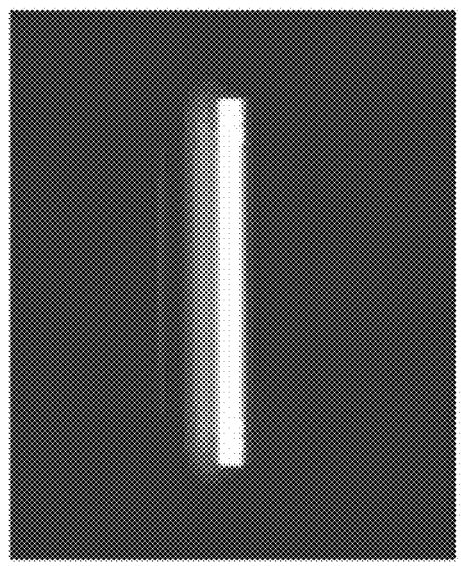
FIG. 5B is a diagram showing a captured image according to the embodiment of the present invention.

FIG. 4 shows an object in the embodiment of the present invention. Each of FIG. 5A and FIG. 5B shows a captured image according to the embodiment of the present invention. Specifically, each of FIG. 5A and FIG. 5B is an image that is obtained when the bright object shown in FIG. 4 is captured using the optical system shown in FIG. 1.

In this embodiment, each of FIG. 5A and FIG. 5B shows an image of a fluorescent lamp captured at an angle of view approximately 45 degrees. It is assumed that the fluorescent lamp is a light source which is rectangle in shape and has uniform luminance, such as the one shown in FIG. 4. Then, simulated images of the actually captured images shown in FIG. 5A and FIG. 5B are generated by performing a convolution integral on the image of the object shown in FIG. 4 and a PSF image shown in FIG. 2A.

FIG. 5A shows a captured image in which the highest luminance value of the fluorescent lamp is 0.7. FIG. 5B shows a captured image in which the highest luminance value of the fluorescent lamp is 1.3. Note that a luminance saturation level of each of the captured images shown in FIG. 5A and FIG. 5B is 1.0. In FIG. 5B, luminance of the captured image is saturated at the image position which corresponds to a position at which the luminance value on the imaging surface 209 is greater than 1.0.

Figure 6A:
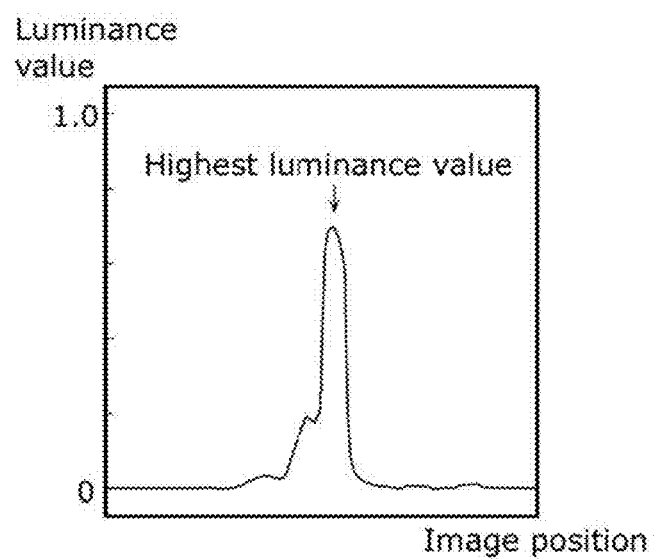
FIG. 6A is a diagram showing a luminance transition of the captured image according to the embodiment of the present invention.
Figure 6B:
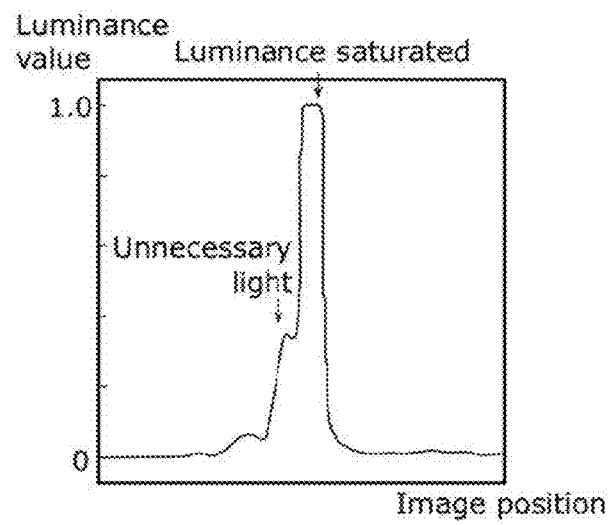
FIG. 6B is a diagram showing a luminance transition of the captured image according to the embodiment of the present invention.

FIG. 6A and FIG. 6B respectively show luminance transition in the horizontal direction of the image near the center of the image of the fluorescent lamp shown in FIG. 5A and FIG. 5B. In FIG. 6A and FIG. 6B, the vertical axes represent a luminance value, and the horizontal axes represents the image position.

FIG. 5A to FIG. 6B show that the luminance value of unnecessary light that appears like a double image in the optical axis direction (the left direction in the image) relative to the fluorescent lamp is greater as the highest luminance value of the fluorescent lamp becomes greater. In other words, the unnecessary light is not so noticeable in FIG. 5A. However, a level of brightness of unnecessary light is increased and visible in FIG. 5B. This indicates that the greater the highest luminance value of the fluorescent lamp is, the greater the luminance value of unnecessary light becomes, and the captured image is adversely affected.

The actual luminance distribution on the imaging surface 209 of the imaging element 208 is lost at the image position at which the luminance is saturated (hereinafter referred to as a "luminance saturation position") in the captured image as shown in FIG. 5B. In other words, a luminance distribution different from the actual luminance distribution on the imaging surface 209 is formed at the luminance saturation position of the captured image. Thus, when the technique according to PTL 1 is used, unnecessary light is estimated based on the incorrect brightness of the object obtained at the luminance saturation position. Consequently, with the method described in PTL 1, unnecessary light cannot be appropriately estimated, and the unnecessary light in the captured image cannot be reduced.

In view of the above, an embodiment of the present invention described below describes an image processing device and an imaging device that can reduce the unnecessary light that appears when the luminance of the captured image is saturated, such as those shown in FIG. 5B and FIG. 6B.

Note that all the embodiments described below show preferable specific examples of the present invention. In other words, the numerical values, shapes, materials, structural elements, the arrangement and connection of the structural elements, steps, and the processing order of the steps etc. shown in the following embodiment are given not for limiting the present invention but merely for illustrative purposes only. The scope of the present invention is defined based on the Claims. Therefore, among the structural elements in the following embodiment, structural elements not recited in any one of the independent claims defining the most generic part of the inventive concept are not necessarily required to solve the problems considered by the present invention but shall be described as a structural elements of a preferable embodiment.

Embodiment

The following describes an embodiment of the present invention with reference to the drawings.

Figure 7A:
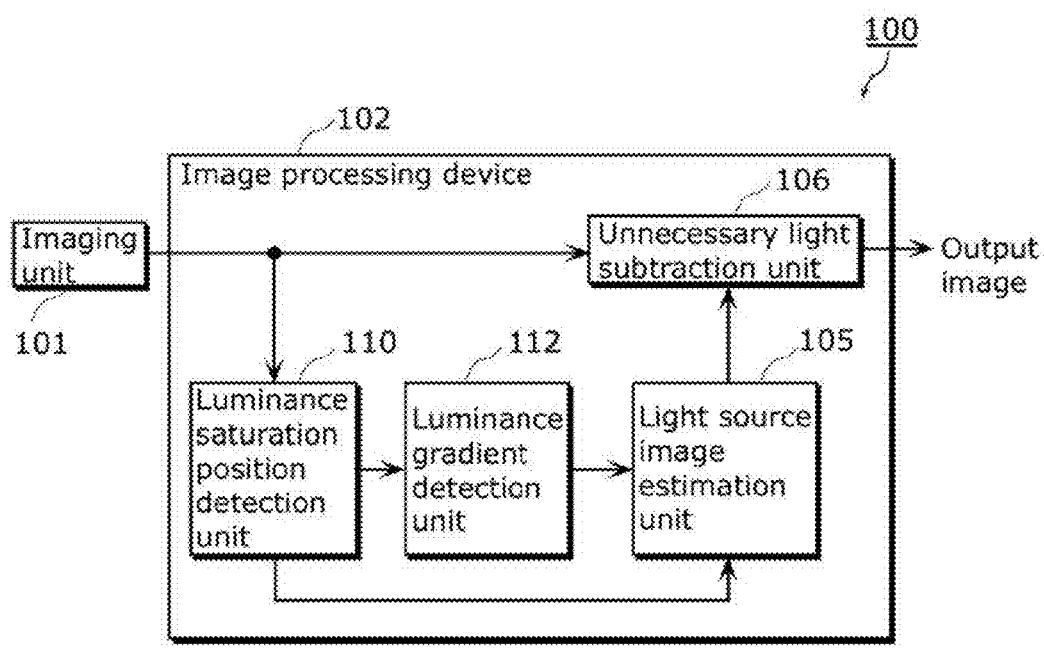
FIG. 7A is a block diagram showing a structure of an imaging device according to the embodiment of the present invention.
Figure 7B:
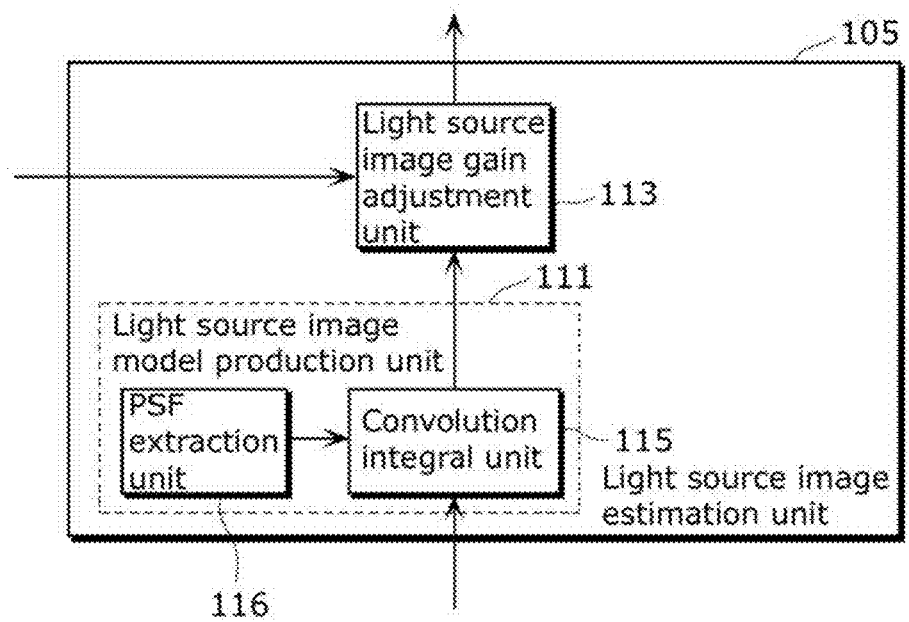
FIG. 7B is a block diagram showing an example of a structure of a light source image estimation unit according to the embodiment of the present invention.

FIG. 7A is a block diagram showing a structure of an imaging device 100 according to the embodiment of the present invention. FIG. 7B is a block diagram showing an example of a structure of a light source image estimation unit according to the embodiment of the present invention. In FIG. 7A, the imaging device 100 includes: an imaging unit 101 and an image processing device 102.

The imaging unit 101 includes the optical system 200 and the imaging element 208 shown in FIG. 1. The imaging unit 101 captures an image of an object, and outputs a captured image It(x, y). Here, "x" and "y" represent an image position in the horizontal direction and the vertical direction of the image, respectively. Note that the image position is a position on the captured image. For example, the image position indicates the position of each of the pixels included in the captured image.

The image processing device 102 reduces a component of unnecessary light in the captured image, and outputs an output image that shows less deterioration in picture quality due to the unnecessary light. Specifically, the image processing device 102 regards that, among object images in the captured image, an object image having the luminance greater than or equal to a predetermined threshold value "Is" is a light source image, and estimates the luminance distribution on the imaging surface 209 formed by the light source. Then, the image processing device 102 subtracts the luminance value of the unnecessary light from the captured image, based on the estimated luminance distribution on the imaging surface 209, and thus generates the output image that shows less deterioration in picture quality due to unnecessary light compared to the captured image. Note that the luminance value of unnecessary light is a luminance value of the image formed by unnecessary light (unnecessary light image).

Note that although this embodiment describes the case in which the image processing device 102 is included in the imaging device 100, the image processing device 102 need not necessarily be included in the imaging device 100. For example, the image processing device 102 may obtain a captured image from an imaging device which includes the imaging unit 101.

The following describes the image processing device 102 in detail. As shown in FIG. 7A, the image processing device 102 includes: a luminance saturation position detection unit 110, a luminance gradient detection unit 112, a light source image estimation unit 105, and an unnecessary light subtraction unit 106.

The luminance saturation position detection unit 110 detects a luminance saturation position that is a position in a captured image at which a luminance value is greater than a predetermined value. In other words, the luminance saturation position detection unit 110 detects, as the luminance saturation position, an image position in the captured image at which the luminance value is greater than a threshold value.

The luminance gradient detection unit 112 detects a luminance gradient around the luminance saturation position. The luminance gradient indicates a rate of a spatial change of the luminance value in the captured image.

The light source image estimation unit 105 estimates the light source image on the imaging surface 209, based on (i) the image at the luminance saturation position, (ii) a PSF image which corresponds to the luminance saturation position, and (iii) the luminance gradient, such that the luminance value increases as the luminance gradient increases. The light source image is a luminance distribution formed by the light source. Furthermore, the light source corresponds to the object whose image is captured at the luminance saturation position.

In this embodiment, as shown in FIG. 7B, the light source image estimation unit 105 includes: a light source image model production unit 111 which includes a convolution integral unit 115 and a PSF extraction unit 116; and a light source image gain adjustment unit 113. Note that the structure of the light source image estimation unit 105 shown in FIG. 7B is an example. The light source image estimation unit 105 need not necessarily have such a structure.

The unnecessary light subtraction unit 106 subtracts a luminance value of unnecessary light in the captured image by using the estimated light source image on the imaging surface 209. In other words, the unnecessary light subtraction unit 106 subtracts, from the captured image, the unnecessary light component obtained from the estimated light source image on the imaging surface 209, and thus generates the output image which shows less image deterioration due to unnecessary light compared to the captured image.

Next, processing performed by the luminance saturation position detection unit 110 and the light source image model production unit 111 that is included in the light source image estimation unit 105 is described in detail.

The luminance saturation position detection unit 110 detects, as the luminance saturation position, the image position having a luminance value greater than the luminance threshold value "Is" in the captured image output by the imaging unit 101. Then, the luminance saturation position detection unit 110 stores the data which indicates the detected luminance saturation position in a memory or the like.

The luminance threshold value "Is" is set to, for example, approximately 0.98 when the range of the luminance value that can be expressed in the captured image is from 0 to 1.0. The luminance threshold value "Is" may be set according to the image-capturing characteristics or the like of the imaging element 208.

Figure 8:
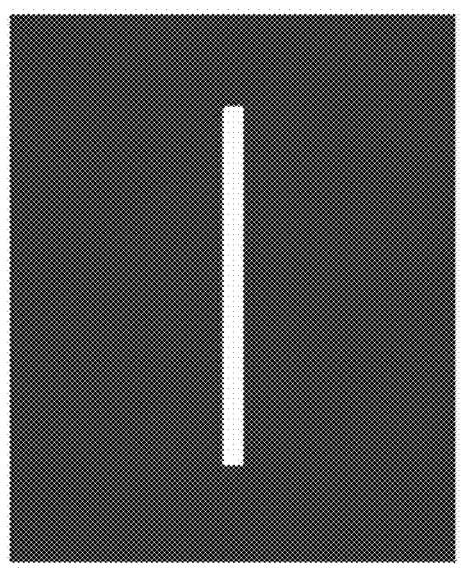
FIG. 8 is a diagram showing a luminance saturation position of the captured image according to the embodiment of the present invention.

In other words, the luminance saturation position detection unit 110 assumes that the object whose image is captured at the image position having saturated luminance is a light source, and detects the light source. In an actual environment where images are captured, luminance of a fluorescent lamp, a lamp, and the like, which are objects significantly brighter compared to other objects often saturated. Therefore, it is reasonable to assume that the object whose image is captured at the luminance saturation position is the light source. FIG. 8 shows the luminance saturation position detected from the captured image shown in FIG. 5B.

Next, the light source image model production unit 111 produces a light source image model by performing a convolution integral on the image at the luminance saturation position and the PSF image which corresponds to the luminance saturation position. The light source image model production unit 111 includes the convolution integral unit 115 and the PSF extraction unit 116.

The convolution integral unit 115 sets the luminance value at the luminance saturation position to a constant value Ic, and produces a light source shape image If(x, y) in which the luminance value at other image position is set to zero. Then, the convolution integral unit 115 produces a light source image model Im(x, y) by performing a convolution integral on a PSF image Ipsf(x, y) for each image position extracted by the PSF extraction unit 116 and the light source shape image If(x, y) as shown in Equation (2).

[Math 2]

$$Im(x,y)=\iint If(x-u,y-v)Ipsf(u,v)dudv \qquad \text{(Equation 2)}$$

Here, "u" and "v" represents an image position in the horizontal direction and the vertical direction of the image, respectively.

Note that although the convolution integral unit 115 obtains Im(x, y) by performing a convolution integral, Im(x, y) need not necessarily be obtained by such a method. For example, the convolution integral unit 115 may obtain Im(x, y) by the following method. First, the convolution integral unit 115 performs Fourier transform on each of If(x, y) and Ipsf(x, y) by using a Fast Fourier Transform (FFT) or the like. Then, the convolution integral unit 115 multiplies in a frequency domain the data obtained by the Fourier transform. Finally, the convolution integral unit 115 calculates the light source image model Im(x, y) by performing inverse Fourier transform on the data obtained by the multiplication. Note that the convolution integral unit 115 may determine whether to perform the calculation in the spatial domain or to perform the calculation in the frequency domain, by considering an amount of calculation and the like.

The PSF extraction unit 116 extracts, from a plurality of PSF images stored in advance in a memory or the like, a PSF image which corresponds to a respective image position. Note that a huge memory capacity is necessary when the PSF image Ipsf(x, y) is stored in advance for each of the image positions. In view of this, the PSF extraction unit 116 may extract, as the PSF image that corresponds to each of image positions, the PSF image of the block to which each image position belongs, from the PSF images stored for each of blocks (e.g., 64×64 pixels) that is a set of image positions. In this case, a PSF image may be stored, for example, for each of ring-shaped blocks about the optical axis, rectangular-shaped blocks, or square-shaped blocks. With this, a memory capacity for storing the PSF image can be reduced.

Note that although the larger the size of the block is, the smaller the memory capacity necessary for storing the PSF image becomes, image positions having large differences between the actual PSF image and the extracted PSF image are increased. Consequently, estimation accuracy of the light source image is decreased. Thus, it is preferable that the size of the block be determined by considering the balance between the memory capacity included in the imaging device and the estimation accuracy of the light source image.

Figure 9A:
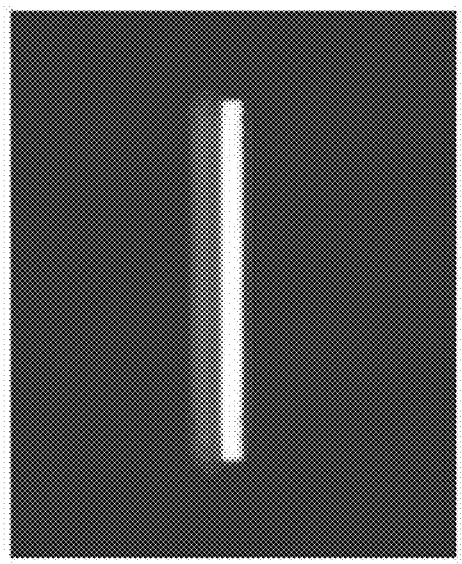
FIG. 9A is a diagram showing a light source image model according to the embodiment of the present invention.
Figure 9B:
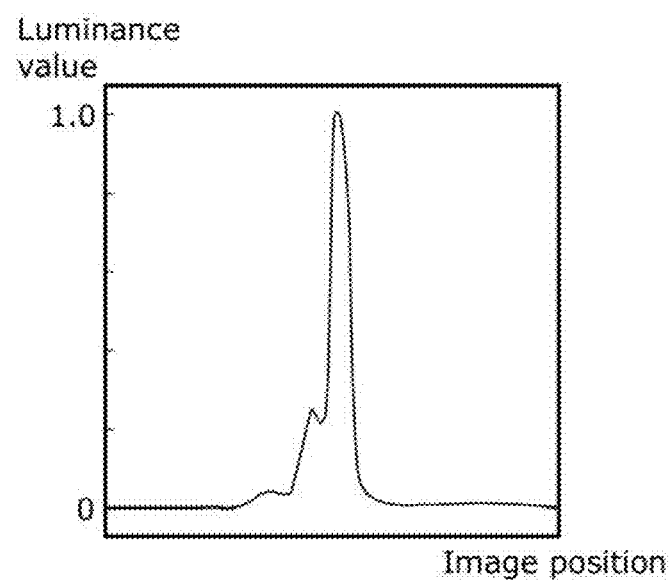
FIG. 9B is a diagram showing a luminance transition of the light source image model according to the embodiment of the present invention.

FIG. 9A shows a light source image model produced based on the PSF image shown in FIG. 2A and the light source shape image shown in FIG. 8 by using Equation (2). FIG. 9B shows a luminance transition of a light source image model shown in FIG. 9A. Note that, here, the light source image model is normalized such that the highest luminance value is 1.0. The normalization may be performed according to a system specification when implemented.

The following describes the processing performed by the luminance gradient detection unit 112.

The luminance gradient detection unit 112 detects in the captured image a luminance gradient Dm around the luminance saturation position detected by the luminance saturation position detection unit 110. Specifically, first, the luminance gradient detection unit 112 calculates, as a derivative value, the absolute value of a difference between the luminance values of adjacent image positions by performing a derivative calculation.

Figure 10:
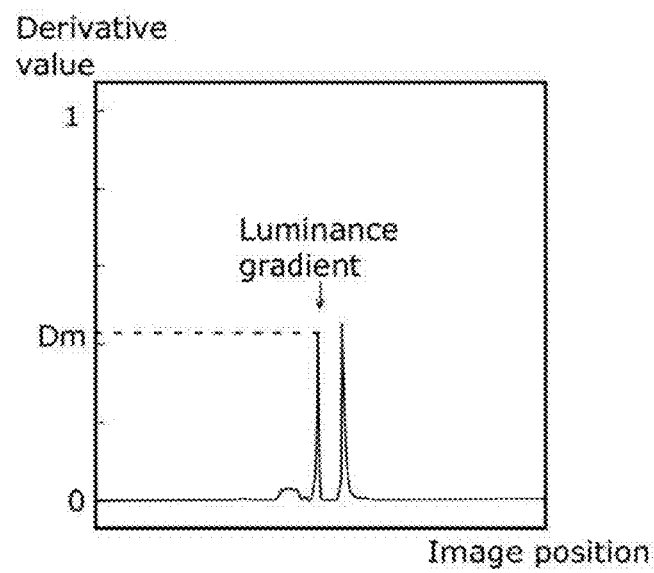
FIG. 10 is a diagram showing a transition of a derivative value of a luminance value around a luminance saturation position of a captured image according to the embodiment of the present invention.

FIG. 10 shows a transition of a derivative value of the luminance value around the luminance saturation position, which is calculated by the derivative calculation based on the luminance transition in FIG. 6B. Here, the luminance gradient detection unit 112 detects, as the luminance gradient Dm, the largest value of the derivative values in the surrounding area of the luminance saturation position on the side of the optical axis. Note that the luminance gradient Dm need not necessarily be the largest value of the derivative values of the surrounding area of the luminance saturation position. For example, the luminance gradient Dm may be the average value of the derivative values of the surrounding area of the luminance saturation position.

The following describes the processing performed by the light source image gain adjustment unit 113 included in the light source image estimation unit 105.

Figure 11:
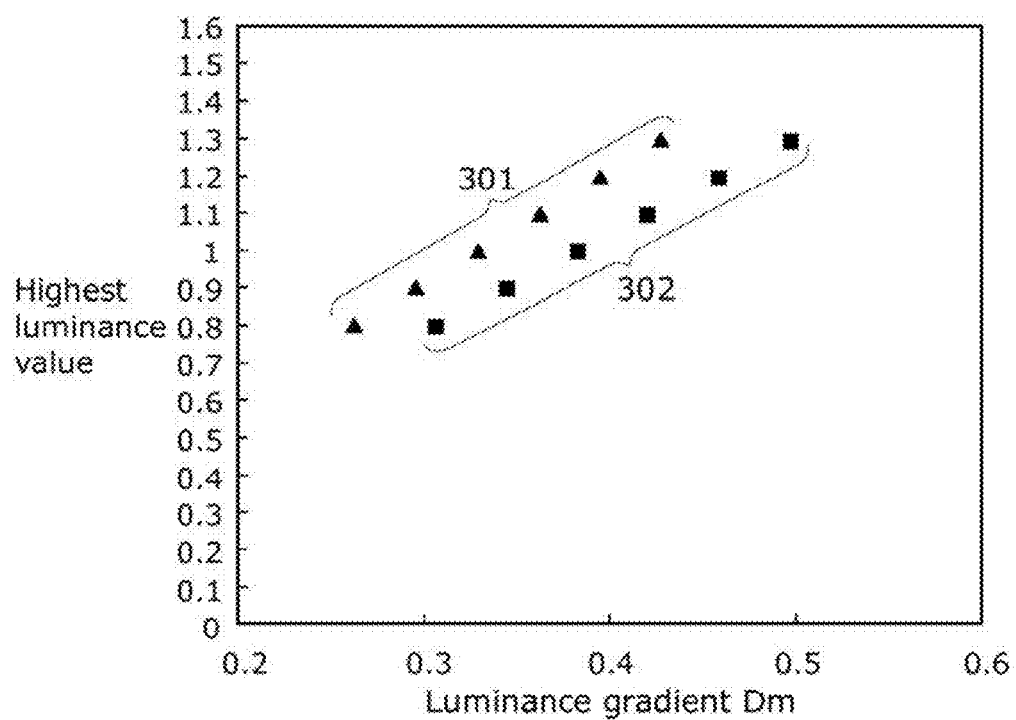
FIG. 11 is a graph showing a relationship between a luminance gradient of the captured image and the highest luminance value of the light source image according to the embodiment of the present invention.

FIG. 11 shows a relationship between the luminance gradient Dm and the actual highest luminance value of the light source image on the imaging surface 209.

In FIG. 11, a first data 301 shows a relationship between the luminance gradient Dm and the actual highest luminance value on the imaging surface 209, when the fluorescent lamp shown in FIG. 4 is captured. The first data 301 shows that there is a proportional relationship between the luminance gradient Dm and the highest luminance value.

In FIG. 11, a second data 302 shows a relationship between the luminance gradient Dm and the highest luminance value, when the fluorescent lamp having a width one half as great as the width of the fluorescent lamp shown in FIG. 4 is captured. The second data 302 shows that the relationship between the luminance gradient Dm and the highest luminance value does not change significantly even when the width of the fluorescent lamp is reduced to a half.

More specifically, the highest luminance value on the same luminance gradient Dm is changed only approximately by 10% between the first data 301 and the second data 302. In other words, the luminance gradient Dm does not vary much with the change in shape of the light source. Therefore, the light source image gain adjustment unit 113 can estimate the actual highest luminance value of the light source on the imaging surface 209 no matter what the shape of the light source may be, by detecting the luminance gradient Dm around the luminance saturation position.

As described, even when the luminance is saturated in a portion of a region of the captured image, the luminance gradient around the saturation region is proportional to the actual highest luminance value of the light source captured at the saturation region on the imaging surface 209. Furthermore, even when the shape of the object is changed, the magnitude of the luminance gradient around the saturation region does not change significantly. Thus, the light source image gain adjustment unit 113 can estimate from the luminance gradient Dm the highest luminance value with high accuracy, by storing in advance the relationship between the luminance gradient Dm and the highest luminance value. Then, the image processing device 102 can reduce the Unnecessary light in the captured image by adjusting the luminance value of the light source image model by using the thus estimated highest luminance value.

Specifically, by using Equation (3), the light source image gain adjustment unit 113 calculates a highest luminance value Imax on the imaging surface 209 from the detected luminance gradient Dm. Note that Equation (3) corresponds to a predetermined relationship between the luminance gradient of the captured image and the highest luminance value on the imaging surface 209.

[Math 3]

$$Imax = A \cdot Dm + B \quad \text{(Equation 3)}$$

In this embodiment, parameters A and B in Equation (3) are: A=2.6153, and B=0. The values of these parameters A and B are set such that the highest luminance value Imax obtained from the luminance gradient Dm is approximately 10% smaller than the actual highest luminance value (the first data 301 in FIG. 11).

Note that the values of parameters A and B may be set such that the highest luminance value Imax obtained from the luminance gradient Dm equals to the actual highest luminance value (the first data 301 in FIG. 11). However, as shown by the second data 302 in FIG. 11, the actual highest luminance value on the luminance gradient Dm can vary slightly when the shape of the light source is changed. In view of the above, it is preferable that the values of the parameters A and B be set such that the highest luminance value Imax is slightly smaller than the actual highest luminance value indicated by the first data 301. With this, the light source image gain adjustment unit 113 is less likely to estimate the highest luminance value to be larger than the actual value when the shape of the light source is changed. Consequently, the unnecessary light subtraction unit 106 is less likely to excessively subtract the unnecessary light component from the captured image.

More specifically, in this embodiment, the value of the parameter B in Equation (3) is set to be below an approximation straight line obtained from the first data 301 in FIG. 11 by using a least square method or the like. With this, the highest luminance value Imax is less likely to be estimated to be larger than the actual highest luminance value.

The light source image gain adjustment unit 113 produces an estimated light source image Ie(x, y) by multiplying the light source image model Im(x, y) by the highest luminance value Imax calculated according to Equation (3). In other words, the light source image gain adjustment unit 113 estimates the light source image on the imaging surface 209 by adjusting the luminance value of the light source image model Im(x, y) such that the luminance value at the luminance saturation position matches the highest luminance value Imax.

Note that although the predetermined relationship between the luminance gradient Dm and the highest luminance value Imax is expressed by the linear function here, the predetermined relationship may be expressed by a suitable polynomial such as a quadratic function as appropriate. Furthermore, the relationship between the luminance gradient Dm and the highest luminance value Imax may be indicated by a table in which the luminance gradient Dm is associated with the highest luminance value Imax. In this case, the light source image gain adjustment unit 113 may estimate the highest luminance value Imax that corresponds to the luminance gradient Dm by referring to the table. Note that the memory capacity can be reduced by storing the relationship between the luminance gradient Dm and the highest luminance value Imax as a mathematical expression compared to the case where the relationship is stored as a table.

Furthermore, it is preferable that the predetermined relationship between the luminance gradient Dm and the highest luminance value Imax be stored for each of the image position. In this way, the light source image gain adjustment unit 113 can more accurately estimate the highest luminance value according to the luminance saturation position in the captured image. Note that the predetermined relationship between the luminance gradient Dm and the highest luminance value Imax may be stored for each of blocks (e.g., 64×64 pixels) that is a collection of image positions. In this case, the memory capacity can be reduced compared to the case where the predetermined relationship between the luminance gradient Dm and the highest luminance value Imax is stored for each of the image positions.

As described above, the light source image gain adjustment unit 113 estimates, by using the predetermined relationship between the luminance gradient and the highest luminance value, the highest luminance value on the imaging surface 209 which corresponds to the detected luminance gradient. Then, the light source image gain adjustment unit 113 adjusts the luminance value of the light source image model by using the estimated highest luminance value. It is possible to regard, in the estimated light source image Ie(x, y) having a luminance value adjusted as described above, that the luminance distribution, which is lost when the luminance is saturated in the captured image, on the imaging surface 209 formed by the light source is restored.

The following describes the processing performed by the unnecessary light subtraction unit 106. The unnecessary light subtraction unit 106 generates an output image in which unnecessary light has been reduced compared to the captured image, by subtracting at the image position other than the luminance saturation position the estimated light source image Ie(x, y) from the captured image It(x, y). In other words, the unnecessary light subtraction unit 106 subtracts the luminance value of the image position other than the luminance saturation position in the estimated light source image from the luminance value of the corresponding image position in the captured image.

Figure 12A:
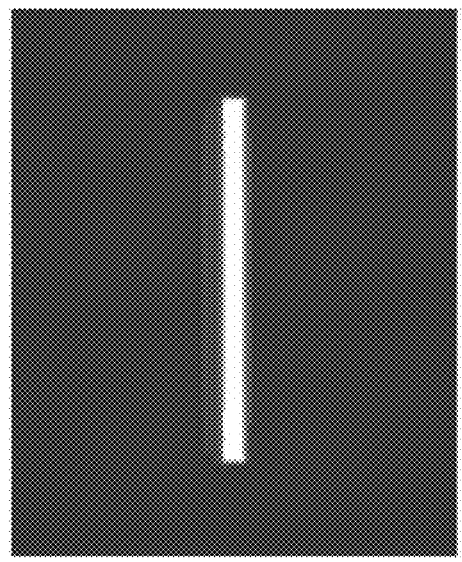
FIG. 12A is a diagram showing an output image according to the embodiment of the present invention.
Figure 12B:
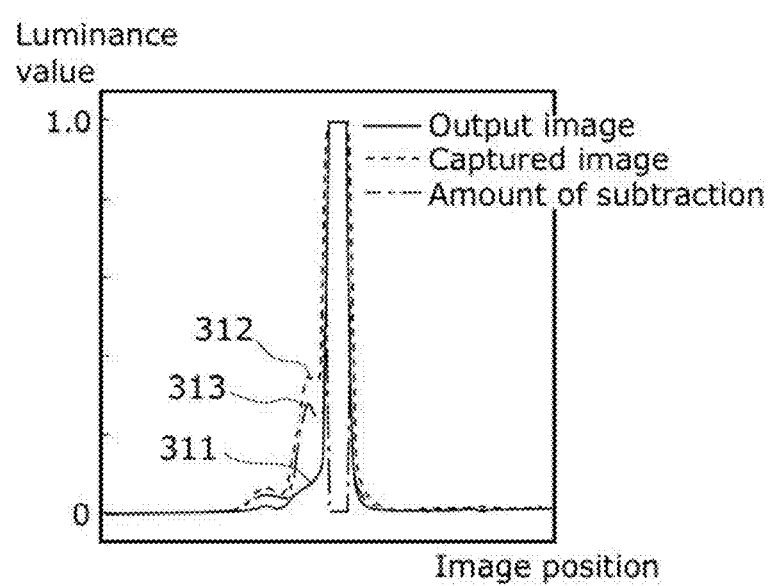
FIG. 12B is a diagram showing a luminance transition of the output image according to the embodiment of the present invention.

FIG. 12A shows an example of an output image according to the embodiment of the present invention. FIG. 12B shows a luminance transition in the horizontal direction of the image near the center of the output image shown in FIG. 12A.

In FIG. 12B, a solid line 311 shows the luminance transition of the output image, a dotted line 312 shows the luminance transition of the captured image It(x, y), and a broken line 313 shows the luminance transition of the unnecessary light obtained from the estimated light source image Ie(x, y) (amount of subtraction from the captured image). The amount of subtraction is zero at the position having saturated luminance in the It(x, y). FIG. 12A shows that the unnecessary light included in the captured image is significantly reduced in the output image.

The following describes the case where the shape of the object is different from the above.

Figure 13A:
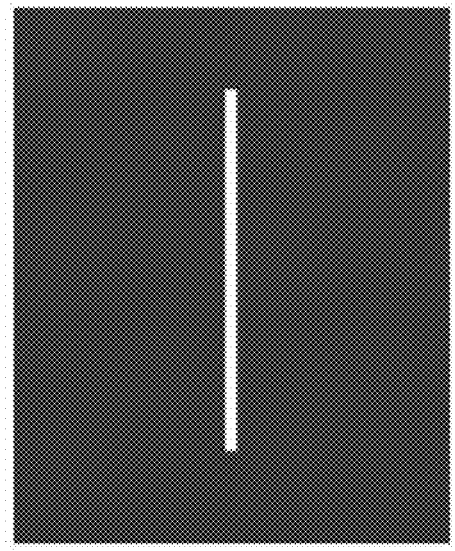
FIG. 13A is a diagram showing another example of an object according to the embodiment of the present invention.

FIG. 13A shows another example of the object according to the embodiment of the present invention. Specifically, FIG. 13A shows an object having a width one half as great as the width of the object shown in FIG. 4. More specifically, FIG. 13A shows a light source obtained by reducing the width of the fluorescent lamp shown in FIG. 4 to a half.

Figure 13B:
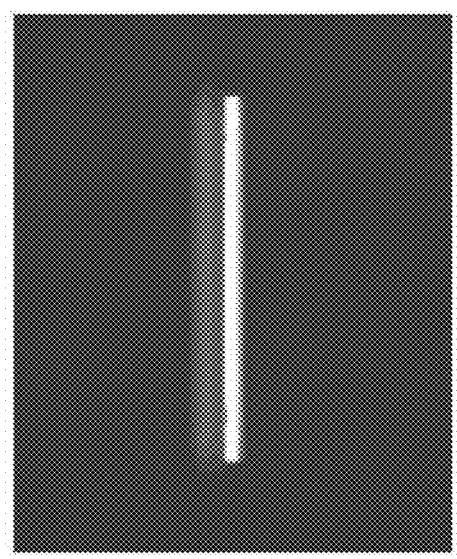
FIG. 13B is a diagram showing another example of a captured image according to the embodiment of the present invention.

FIG. 13B shows another example of the captured image according to the embodiment of the present invention. Specifically, FIG. 13B shows a captured image It(x, y) obtained by capturing the object shown in FIG. 13A. As with FIG. 5B, the luminance of the image position at which the object is captured is saturated in the captured image shown in FIG. 13B.

Figure 13C:
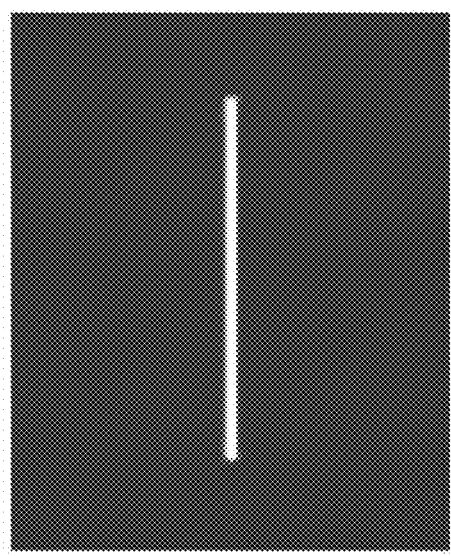
FIG. 13C is a diagram showing another example of an output image according to the embodiment of the present invention.

FIG. 13C shows another example of the output image according to the embodiment of the present invention. Specifically, FIG. 13C shows the output image that is an image obtained by reducing the unnecessary light in the captured image shown in FIG. 13B.

Figure 13D:
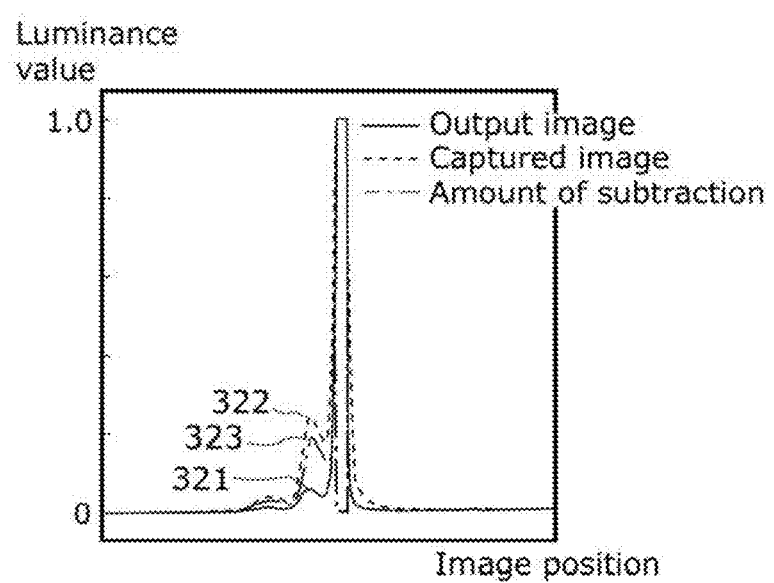
FIG. 13D is a diagram showing another example of a luminance transition of the output image according to the embodiment of the present invention.

FIG. 13D shows luminance transition in the horizontal direction of the image near the center of the output image shown in FIG. 13C. In FIG. 13D, the vertical axis represents the luminance value, and the horizontal axis represents the image position. As with FIG. 12B, a solid line 321 shows the luminance transition of the output image, a dotted line 322 shows the luminance transition of the captured image It(x, y), and a broken line 323 shows the luminance transition of the unnecessary light obtained from the estimated light source image Ie(x, y) (amount of subtraction from the captured image).

Figure 14A:
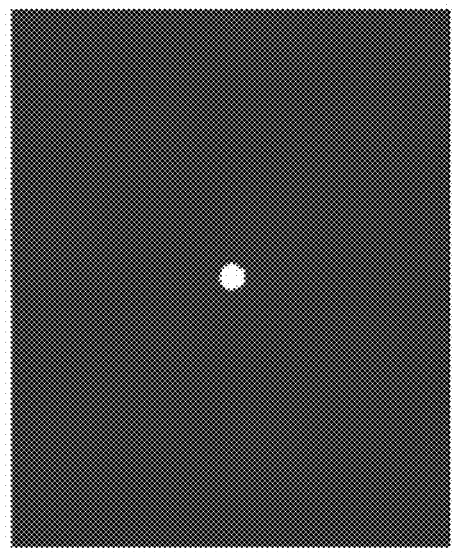
FIG. 14A is a diagram showing another example of an object according to the embodiment of the present invention.
Figure 14B:
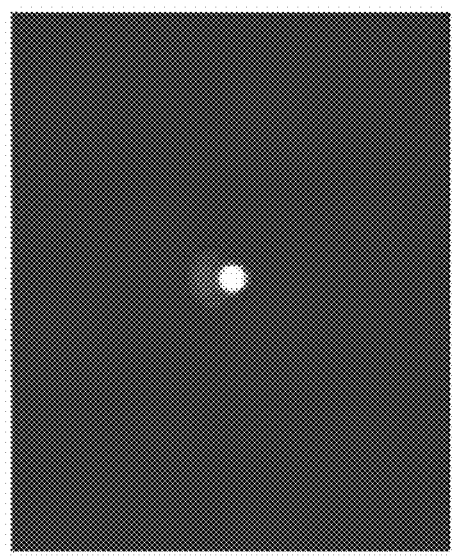
FIG. 14B is a diagram showing another example of a captured image according to the embodiment of the present invention.

FIG. 14A shows another example of the object according to the embodiment of the present invention. Specifically, FIG. 14A shows a round-shaped light source such as a halogen lamp. FIG. 14B shows another example of the captured image according to the embodiment of the present invention. Specifically, FIG. 14B shows a captured image It(x, y) which captures the object shown in FIG. 14A. As with FIG. 5B, the luminance at the image position at which the object is captured is saturated in the captured image shown in FIG. 14B.

Figure 14C:
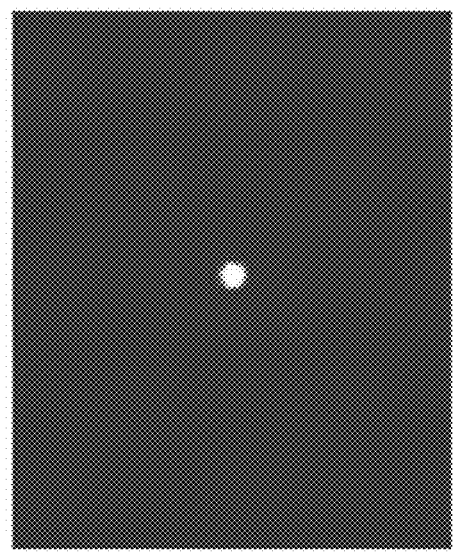
FIG. 14C is a diagram showing another example of an output image according to the embodiment of the present invention.

FIG. 14C shows another example of the output image according to the embodiment of the present invention. Specifically, FIG. 14C shows the output image that is an image obtained by reducing the unnecessary light in the captured image shown in 14B.

Figure 14D:
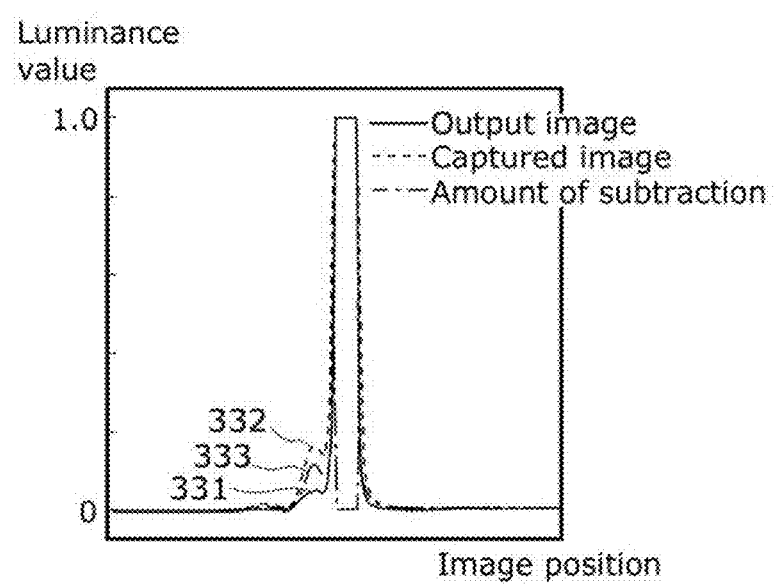
FIG. 14D is a diagram showing another example of a luminance transition of the output image according to the embodiment of the present invention.

FIG. 14D shows luminance transition in the horizontal direction of the image near the center of the output image shown in FIG. 14C. In FIG. 14D, the vertical axis represents the luminance value, and the horizontal axis represents the image position. As with FIG. 12B, a solid line 331 shows the luminance transition of the output image, a dotted line 332 shows the luminance transition of the captured image It(x, y), and a broken line 333 shows the luminance transition of the unnecessary light obtained from the estimated light source image Ie(x, y) (amount of subtraction from the captured image).

Note that, when generating the output image shown in FIG. 13C or FIG. 14C, the light source image gain adjustment unit 113 estimates the highest luminance value by using Equation (3) in which same values are set to the parameters A and B as the time when the output image shown in FIG. 12A is generated. As the output image in FIG. 13C or FIG. 14C shows, the unnecessary light included in the captured image is significantly reduced in the output image, regardless of a change in shape of the object.

The following describes various operations performed by the imaging device 100 having the structure described above.

Figure 15A:
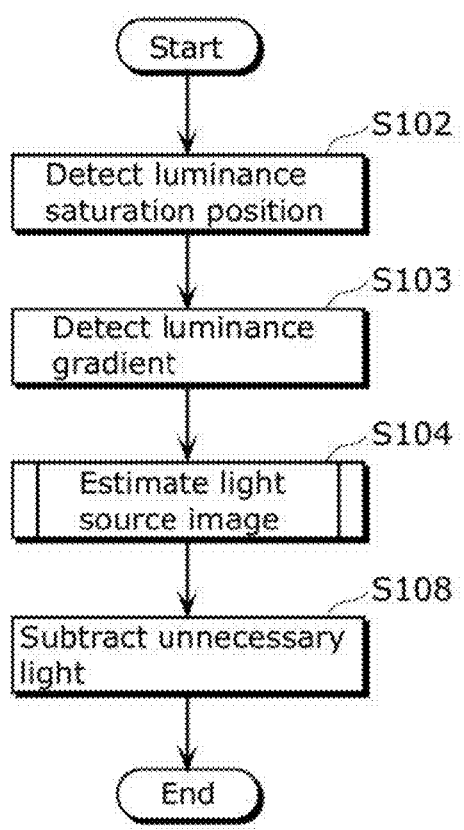
FIG. 15A is a flowchart showing image processing according to the embodiment of the present invention.
Figure 15B:
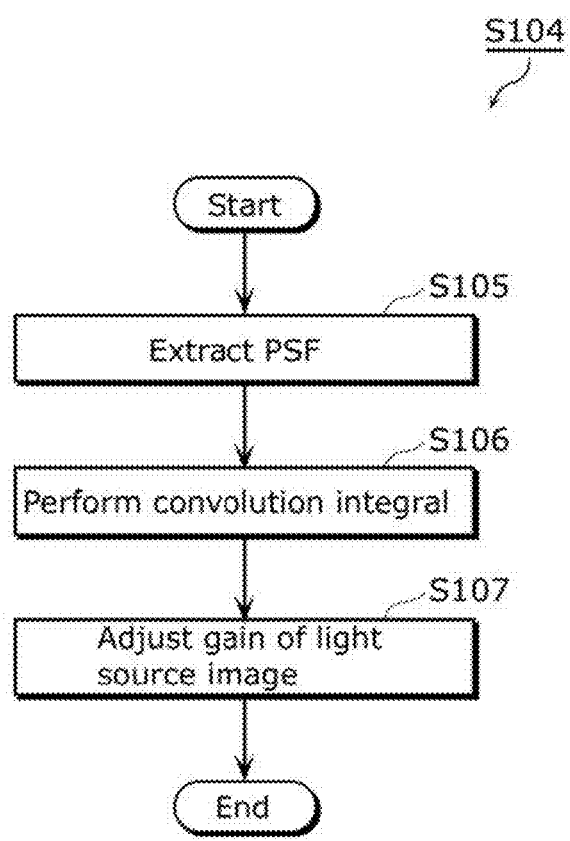
FIG. 15B is a flowchart showing an example of light source image estimation processing according to the embodiment of the present invention.

FIG. 15A is a flowchart showing image processing according to the embodiment of the present invention. In FIG. 15A, it is assumed that the imaging unit 101 already produced an image captured through the optical system 200. FIG. 15B is a flowchart showing an example of light source image estimation processing according to the embodiment of the present invention.

First, the luminance saturation position detection unit 110 detects the luminance saturation position in the captured image (S102).

The luminance gradient detection unit 112 detects, by a derivative calculation, the luminance gradient Dm around the luminance saturation position detected in Step S102 (S103). The light source image estimation unit 105 estimates the light source image on the imaging surface 209 based on the detected luminance gradient Dm (S104).

An example of the details of processing performed in Step S104 according to this embodiment is shown in FIG. 15B. Note that the processing of Step S104 need not necessarily be performed as shown in FIG. 15B. In other words, in Step S104, it is only necessary to estimate a luminance distribution on the imaging surface, based on (i) an image at the luminance saturation position, (ii) a PSF image which corresponds to the luminance saturation position, and (iii) the luminance gradient, such that the luminance value increases as the luminance gradient increases. The luminance distribution is formed by an object whose image is captured at the luminance saturation position. The following describes the flowchart shown in FIG. 15B.

First, the PSF extraction unit 116 extracts, from a plurality of PSF images stored in advance in a memory or the like, the PSF image which corresponds to the luminance saturation position detected in Step S102 (S105). Note that the PSF extraction unit 116 may produce the PSF image which corresponds to the luminance saturation position by rotating as necessary the PSF image stored in the memory. Alternatively, the PSF extraction unit 116 may store in advance the same PSF image for each block, and read the PSF image of the block to which the luminance saturation position belongs.

Subsequently, the convolution integral unit 115 produces a light source image model by performing a convolution integral on two images, that is, the light source shape image produced based on the luminance saturation position detected in Step S102 and the PSF image extracted in Step S103 (S106). Note that, instead of performing the convolution integral, the convolution integral unit 115 may perform Fourier transform by a FFT or the like on each of the two images, multiply the results, and perform inverse Fourier transform to produce the light source image model.

Next, the light source image gain adjustment unit 113 estimates the luminance distribution of the light source image by adjusting the luminance value of the light source image model such that the luminance value increases as the luminance gradient increases (S107). Specifically, the light source image gain adjustment unit 113 estimates the highest luminance value Dmax on the imaging surface which corresponds to the detected luminance gradient Dm, by using the predetermined relationship between the luminance gradient of the captured image and the highest luminance value on the imaging surface. Then, the light source image gain adjustment unit 113 estimates as the light source image the luminance distribution of the light source on the imaging surface 209 based on the light source image model and the highest luminance value Dmax.

As described above, after the light source image is estimated in Step S104, the unnecessary light subtraction unit 106 generates the output image in which the unnecessary light has been reduced, by subtracting the luminance value of light source image on the imaging surface 209, which has been estimated in Step S106, from the luminance value of the captured image at the image position other than the luminance saturation position in the captured image (S108).

As described above, even when visible unnecessary light appeared in an image in which a bright object is captured, this embodiment makes it possible to appropriately reduce, by using a captured image obtained by a single shooting, the unnecessary light in the captured image by (i) estimating the light source image model from the image at the luminance saturation position in the captured image and the PSF image, and (ii) adjusting the luminance value of the light source image model by using the highest luminance value estimated from the luminance gradient around the luminance saturation position.

In other words, according to the image processing device 102 in this embodiment, the luminance distribution on the imaging surface 209 formed by the object whose image is captured at the luminance saturation position can be estimated such that the luminance value increases as the luminance gradient of the captured image increases. In other words, even when the correct luminance distribution is not obtained from the captured image due to the saturation of the luminance, the luminance distribution on the imaging surface 209 can be accurately estimated by using the luminance gradient. It is possible to generate, based on one captured image, the output image that has suitably reduced unnecessary light compared to the captured image, by subtracting the luminance value of the unnecessary light from the captured image by using the thus estimated luminance distribution on the estimated imaging surface 209.

Furthermore, according to the image processing device 102, it is possible to subtract the luminance value of the unnecessary light from the captured image, by using the luminance distribution on the imaging surface 209 estimated based on the PSF image. In other words, image processing is performed not targeting only the unnecessary diffracted light other than the design order. Thus, the unnecessary light which appears in the captured image without depending on an order can also be reduced.

Moreover, according to the image processing device 102, it is possible to accurately estimate the highest luminance value by using the predetermined relationship between the luminance gradient of the captured image and the highest luminance value on the imaging surface 209. The luminance distribution formed on the imaging surface 209 by the object can be accurately estimated, by adjusting the luminance value of the light source image model by using the thus estimated highest luminance value. Therefore, it is possible to generate an output image that has suitably reduced unnecessary light compared to the captured image.

Although the imaging device 100 and the image processing device 102 according to an aspect of the present invention have been described thus far, the present invention is not limited to the above embodiment. Various modifications to the above-described embodiment that may be conceived by a person of ordinary skill in the art which do not depart from the essence of the present invention are intended to be within the scope of the present invention.

For example, as shown in FIG. 10, although the luminance gradient detection unit 112 in the above-described embodiment detects the luminance gradient on the side of the optical axis 210 in the surrounding area of the luminance saturation position, the luminance gradient detection unit 112 may detect the luminance gradient on the side opposite to the optical axis 210. For example, in FIG. 10, the luminance gradient detection unit 112 may detect, as the luminance gradient, the largest value of the derivative values on the right side of the luminance saturation position. In the image captured using the optical system 200 including the diffractive lens 202, large unnecessary light appears on the side of the optical axis 210 relative to the luminance saturation position. In other words, the luminance gradient on the side opposite to the optical axis 210 is less affected by the unnecessary light compared to the luminance gradient on the side of the optical axis 210. Thus, the luminance gradient detection unit 112 can reduce the influence of the unnecessary light on the detected luminance gradient, by detecting the luminance gradient on the side opposite to the optical axis 210. Consequently, the light source image estimation unit 105 can more accurately estimate the light source image on the imaging surface 209.

Furthermore, although the light source image estimation unit 105 in the above-described embodiment adjusts the luminance value of the light source image model based on the luminance gradient, the light source image estimation unit 105 need not necessarily adjust the luminance value of the light source image model. For example, the light source image estimation unit 105 may adjust the luminance value of the PSF image or the luminance value of the image at the luminance saturation position in the captured image, based on the luminance gradient. In other words, the light source image estimation unit 105 need not necessarily have the structure shown in FIG. 7B. In this case, as with the case where the luminance value of the light source image is adjusted, the light source image estimation unit 105 can accurately estimate the light source image model, by adjusting the luminance value of the PSF image or the luminance value of the image at the luminance saturation position in the captured image such that the luminance value increases as the luminance gradient increases.

Furthermore, although the light source image gain adjustment unit 113 in the above-described embodiment estimates the highest luminance value from the luminance gradient, the light source image gain adjustment unit 113 may estimate, instead of the highest luminance value, the coefficient for adjusting the luminance value of the light source image model or the like.

Note that although the reduction of unnecessary light in the monochrome image has been described in the above embodiment, an implementation of the present invention is applicable to, for example, a color image captured using an imaging element including a color filter having a Bayer matrix, an imaging element including a prism and three matrices of imaging elements for red, green, and blue. Specifically, the image processing device 102 produces for each of the red, green, and blue images an image in which the unnecessary light is reduced in the same manner as the above. Then, the image processing device 102 may produce a color image by synthesizing the red, green, and blue images each having the reduced unnecessary light. At this time, the image processing device 102 may estimate the light source by using a different PSF image for each of the colors, that is, red, green, and blue. Furthermore, the image processing device 102 may, for example, calculate a light source image model for one color such as green, and use the light source image model to reduce the unnecessary light of each of the red, green, and blue colors, based on the luminance gradient around the luminance saturation position. At this time, the image processing device 102 may determine in advance a ratio of the highest luminance value of the light source image which corresponds to each of the colors, and make settings such that the amount of the unnecessary light to be reduced varies according to the ratio.

Note that the above-described embodiment describes an example in which the unnecessary light is reduced in the image which is captured using the optical system including the diffractive optical element. However, as with the above-described embodiment, the image processing device 102 can reduce the unnecessary light in the image captured using an optical system which does not include the diffractive optical element. For example, in the case where the unnecessary light appears because the aberration of the optical system is large or the like, too, the luminance gradient around the saturated image region is proportional to the highest luminance value of the saturated light source image, and the magnitude of the luminance gradient around the saturated image region does not vary significantly even when the object is changed. Therefore, it is apparent that an implementation of the present invention is applicable to the image that is captured using the optical system which does not include the diffractive optical element. In this case, the parameters A and B in Equation (3) that indicates the predetermined relationship between the luminance gradient of the captured image and the highest luminance value on the imaging surface 209 may be set appropriately depending on the optical system. For example, a plurality of combinations of the luminance gradient of the captured image and the highest luminance value on the imaging surface 209 may be measured in advance, and the parameters A and B may be set based on the approximation straight line calculated by using a least square method or the like for the measured combinations.

Furthermore, a part or all of the structural elements included in the image processing device 102 may be provided in one system LSI (large scale integration). For example, the image processing device 102 may be configured of a system LSI which includes: the luminance saturation position detection unit 110, the luminance gradient detection unit 112, the light source image estimation unit 105, and the unnecessary light subtracting unit 106.

The system LSI is a super multifunctional LSI manufactured by integrating plural components into one chip and is specifically a computer system which includes a microprocessor, a read only memory (ROM), a random access memory (RAM) and so on. The ROM stores a computer program. The microprocessor operates according to the computer program so that the system LSI can perform its function.

The name used here is LSI, but it may also be called IC, LSI, super LSI, or ultra LSI depending on the degree of integration. Moreover, the means for circuit integration is not limited to an LSI, and implementation with a dedicated circuit or a general-purpose processor is also available. It is also acceptable to use an FPGA (Field Programmable Gate Array) that is programmable after the LSI has been manufactured or a reconfigurable processor in which connections and settings of circuit cells within the LSI are reconfigurable.

In the future, if integrated circuit technology that replaces LSI appears through progress in semiconductor technology or other derived technology, that technology can naturally be used to carry out integration of functional blocks. Application of biotechnology is one such possibility.

Furthermore, the present invention can be realized not only as the image processing device which includes the characteristic processing units, but also as the image processing method which includes, as steps, the characteristic processing units included in the image processing device. Furthermore, the present invention can also be realized as a computer program which causes a computer to execute the characteristic steps included in the image processing method. In addition, it goes without saying that such a computer program can be distributed via a non-transitory computer-readable recording medium such as a compact disk read-only memory (CD-ROM) or via a communication network such as the Internet.

INDUSTRIAL APPLICABILITY

The present invention is useful for an image processing device that can reduce unnecessary light in the captured image or imaging devices such as a digital still camera and a digital video camera that include the image processing device.

REFERENCE SIGNS LIST

100 Imaging Device
101 Imaging unit
102 Image processing device
105 Light source image estimation unit
106 Unnecessary light subtraction unit
110 Luminance saturation position detection unit
111 Light source image model production unit
112 Luminance gradient detection unit
113 Light source image gain adjustment unit
115 Convolution integral unit
116 PSF extraction unit
200 Optical system
201 Lens
202 Diffractive lens
203 First component
204 Second component
206 Diffraction grating
208 Imaging element
209 Imaging surface
210 Optical axis
211 Diaphragm

The invention claimed is:

1. An image processing device comprising:
a luminance saturation position detection unit configured to detect a luminance saturation position that is a position in a captured image at which a luminance value is greater than a predetermined value;
a luminance gradient detection unit configured to detect a luminance gradient around the luminance saturation position;
a light source image estimation unit configured to estimate a luminance distribution on an imaging surface, based on (i) an image at the luminance saturation position, (ii) a point spread function (PSF) image which corresponds to the luminance saturation position, and (iii) the luminance gradient, such that the luminance value increases as the luminance gradient increases, the luminance distribution being formed by an object whose image is captured at the luminance saturation position; and
an unnecessary light subtraction unit configured to subtract a luminance value of unnecessary light from the captured image by using the luminance distribution.

2. The image processing device according to claim 1, wherein said light source image estimation unit includes:
a light source image model production unit configured to produce a light source image model by performing a convolution integral on the image at the luminance saturation position and the PSF image which corresponds to the luminance saturation position; and
a light source image gain adjustment unit configured to estimate the luminance distribution on the imaging surface, by adjusting a luminance value of the light source image model such that the luminance value increases as the luminance gradient increases.

3. The image processing device according to claim 2, wherein said light source image gain adjustment unit is configured to (i) estimate a highest luminance value on the imaging surface which corresponds to the detected luminance gradient, by using a predetermined relationship between the luminance gradient of the captured image and the highest luminance value on the imaging surface, and (ii) adjust the luminance value of the light source image model by using the estimated highest luminance value.

4. The image processing device according to claim 1, wherein the captured image is captured using an optical system including a diffractive optical element, and said luminance gradient detection unit is configured to detect the luminance gradient around the luminance saturation position on a side opposite to an optical axis of the optical system.

5. The image processing device according to claim 1, wherein said image processing device is implemented as an integrated circuit.

6. An imaging device comprising:
said image processing device according to claim 1; and
an imaging unit including an optical system and an imaging element and configured to output the captured image.

7. An image processing method comprising:
detecting a luminance saturation position that is a position in a captured image at which a luminance value is greater than a predetermined value;
detecting a luminance gradient around the luminance saturation position;
estimating a luminance distribution on an imaging surface, based on (i) an image at the luminance saturation position, (ii) a point spread function (PSF) image which corresponds to the luminance saturation position, and (iii) the luminance gradient, such that the luminance value increases as the luminance gradient increases, the luminance distribution being formed by an object whose image is captured at the luminance saturation position; and subtracting a luminance value of unnecessary light from the captured image by using the luminance distribution.

8. A non-transitory computer-readable recording medium, said recording medium having a computer program recorded thereon for causing a computer to execute the image processing method according to claim 7.

\* \* \* \* \*